United States Patent
Kincaid et al.

(10) Patent No.: US 8,219,286 B2
(45) Date of Patent: Jul. 10, 2012

(54) NOISE REDUCTION FOR OCCUPANT DETECTION SYSTEM AND METHOD

(75) Inventors: Kevin D. Kincaid, Kokomo, IN (US); Robert K. Constable, Kokomo, IN (US); Joseph W. Galles, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 261 days.

(21) Appl. No.: 12/768,903

(22) Filed: Apr. 28, 2010

(65) Prior Publication Data

US 2011/0270491 A1 Nov. 3, 2011

(51) Int. Cl.
*B60R 22/00* (2006.01)

(52) U.S. Cl. ......... 701/45; 701/46; 701/47; 701/49; 701/33.7; 702/65; 702/111; 702/190; 702/191; 702/189; 324/684; 324/207.11; 324/658; 324/663; 324/457; 73/862.625

(58) Field of Classification Search ......... 701/45, 701/46, 47, 49, 36, 33.7; 702/65, 111, 190, 702/191, 189, 195; 324/684, 207.11, 658, 324/457, 17
See application file for complete search history.

(56) References Cited

U.S. PATENT DOCUMENTS

| | | | |
|---|---|---|---|
| 5,914,610 A | 6/1999 | Gershenfeld et al. | |
| 5,991,676 A * | 11/1999 | Podoloff et al. | 701/45 |
| 6,161,070 A | 12/2000 | Jinno et al. | |
| 6,179,378 B1 | 1/2001 | Baumgartner et al. | |
| 6,556,137 B1 | 4/2003 | Oka et al. | |
| 6,559,555 B1 | 5/2003 | Saitou et al. | |
| 6,644,689 B2 | 11/2003 | Murphy | |
| 6,696,948 B2 | 2/2004 | Thompson et al. | |
| 6,816,077 B1 | 11/2004 | Shieh et al. | |
| 6,877,606 B2 | 4/2005 | Hardy | |
| 6,960,841 B2 | 11/2005 | Saitou et al. | |
| 7,048,338 B2 | 5/2006 | Pinkos | |
| 7,084,763 B2 | 8/2006 | Shieh et al. | |
| 7,102,527 B2 | 9/2006 | Shieh et al. | |
| 7,151,452 B2 | 12/2006 | Shieh | |
| 7,194,346 B2 | 3/2007 | Griffin et al. | |
| 2004/0111201 A1 | 6/2004 | Thompson et al. | |
| 2005/0253712 A1 | 11/2005 | Kimura et al. | |
| 2006/0187038 A1 | 8/2006 | Shieh et al. | |
| 2009/0267622 A1 | 10/2009 | Hansen et al. | |
| 2009/0271076 A1 * | 10/2009 | Griffin | 701/45 |
| 2011/0270491 A1 * | 11/2011 | Kincaid et al. | 701/45 |

FOREIGN PATENT DOCUMENTS

WO WO9513204 5/1995

OTHER PUBLICATIONS

Pending U.S. Appl. No. 12/433,011, filed Apr. 30, 2009.

(Continued)

*Primary Examiner* — Redhwan k Mawari
(74) *Attorney, Agent, or Firm* — Lawrence D. Hazelton

(57) ABSTRACT

An occupant detection system with noise reduction, a controller having noise reduction for an occupant detection system and a method for reducing noise in an occupant detection system. A high order digital filter is used to filter harmonics of a noise signal from an electrode signal used to determine an occupant presence or absence of the occupant. A way of sampling the electrode signal and the implementation of the high order digital filter cooperate such that the signal processing can be performed by a lower cost general purpose microprocessor as opposed to using a higher cost digital signal processor.

11 Claims, 5 Drawing Sheets

OTHER PUBLICATIONS

Pending U.S. Appl. No. 12/434,079, filed May 1, 2009.
Pending U.S. Appl. No. 12/433,993, filed May 1, 2009.
Pending U.S. Appl. No. 12/433,923, filed May 1, 2009.
Pending U.S. Appl. No. 12/700,243, filed Feb. 4, 2010.

* cited by examiner

NOISE REDUCTION FOR OCCUPANT DETECTION SYSTEM AND METHOD

TECHNICAL FIELD OF INVENTION

The invention generally relates to vehicle passenger occupant detection, and more particularly relates to a system and method for using a digital filter to reduce noise coupled into a vehicle passenger occupant detection system.

BACKGROUND OF INVENTION

It is known to selectively enable or disable a vehicle air bag or other occupant protection device based on the presence of an occupant in a seat. It has been proposed to place electrically conductive material in a vehicle seat to serve as an electrode for detecting the presence of an occupant in the seat. For example, U.S. Patent Application Publication No. 2009/0267622 A1, which is hereby incorporated herein by reference, describes a vehicle occupant detection system that determines the presence of an occupant based on the electrode's electrical characteristics. The electrical characteristics may be determined by coupling an excitation signal to the electrode to generate an electrode signal, and processing the electrode signal to determine an electrode signal magnitude that is indicative of an occupant presence.

The conductive material forming the electrode may behave like an antenna, whereby a noise signal may be coupled into the system such that the accuracy of determining the occupant presence is diminished. For example, a noise signal may be generated by an inverter that receives 12 Volt direct current (VDC) power from the vehicle electrical system and generates 60 Hertz (Hz)/110 Volt alternating current (VAC) power to operate a device such as a laptop computer. Noise generated by such an inverter may be characterized as comprising a 60 Hz fundamental frequency and a series of harmonic frequencies based on integer multiples of 60 Hz (e.g.—120 Hz, 240 Hz, 360 Hz, 480 Hz, . . . ). If an occupant detection system is configured to output an excitation signal having an excitation frequency of 2070 Hz, then it may be necessary to filter harmonics of the noise signal. Specifically, it may be necessary to filter 2040 Hz, the $34^{th}$ harmonic of 60 Hz, and 2100 Hz, the $35^{th}$ harmonic of 60 Hz, out of the electrode signal. Testing indicates that a band-pass filter centered at 2070 Hz should reduce the harmonics of the noise signal by at least 40 decibel (dB) to be effective for preventing a loss of occupant detection accuracy. It will be appreciated by those skilled in the art that a practical implementation of such a filter is by way of a digital filter, for example a 1040 tap digital band-pass filter. Such a digital filter has 1040 filter coefficients that are each multiplied by one of 1040 electrode signal values previously received by periodically sampling the electrode signal at a sampling rate. The digital filter then adds these 1040 multiplication results or terms together to calculate a filter output value. It will also be appreciated that to reliably detect a peak value of the electrode for determining the magnitude of the electrode signal, a sampling rate of ten or more times the excitation frequency is typically used for sampling such an electrode signal. Digital signal processors are known that have circular buffers to index and shift the incoming samples in preparation to multiply each sample by the appropriate filter coefficient. Such digital signal processors may also have special hardware to readily add the terms produced by the multiplication to calculate a filter output value. For the example given above, a 2070 Hz excitation frequency may need to be sampled at 20.7 kHz to assure that a peak value of the electrode signal is reliably detected. To output filter values at a rate equal to the sample rate, a processor must perform 1040 multiplies and 1040 additions 20700 times per second, or 2080 operations for each sample input value However, digital signal processors and high-speed general purpose microprocessors having such capability have an undesirably high cost when considered for use in a vehicle such as an automobile.

SUMMARY OF THE INVENTION

Disclosed herein is a way to periodically sample a signal from an occupant detection system and digitally filter the sampled data that heretofore required a high-speed microprocessor or a digital signal processor. The combination of reducing the sampling rate and processing the sampled data in the manner described reduces the data processing speed requirements so that a lower cost conventional microprocessor may be used without sacrificing the accuracy of the system. By using a lower cost conventional microprocessor the cost of the occupant detection system is reduced.

In accordance with one embodiment of this invention, a vehicle occupant detection system with noise reduction for reducing a noise signal coupled into the system is provided. The noise signal is characterized as having a series of harmonic frequencies based on a fundamental frequency. The system includes a controller and an electrode. The controller is configured to output an excitation signal having an excitation frequency value between harmonic frequencies. The electrode is arranged proximate to an expected location of an occupant for sensing an occupant presence proximate thereto. The electrode is also coupled to the controller and configured to output an electrode signal in response to the excitation signal. The electrode signal includes the noise signal. The controller is further configured to receive a series electrode signal values based on the electrode signal and at a rate based on a sampling period. The controller is also configured to process each one of the electrode signal values in accordance with a predetermined algorithm prior to receiving a subsequent electrode signal value. The sampling period is greater than a processing time for the controller to process one of the electrode signal values and has a varying phase difference with respect to the excitation signal. To process each electrode signal value the controller executes a predetermined algorithm. A non-limiting example of a predetermined that may be executed by the controller may include the controller being further configured to recall one or more stored filter coefficients that define a digital filter that reduces the noise signal by an effective amount, multiply each electrode signal value by one or more of the filter coefficients to form a corresponding one or more terms, and add each term to one of a plurality of output signal accumulators to calculate a series of filter output values, thereby filtering the electrode signal to reduce the noise signal.

In accordance with another embodiment of the present invention, a controller having noise reduction for use in a vehicle occupant detection system having a noise signal coupled into the system is provided. The noise signal is characterized as having a series of harmonic frequencies based on a fundamental frequency. The system comprises an electrode arranged proximate to an expected location of an occupant for sensing an occupant presence proximate thereto. The electrode is coupled to the controller and is configured to output an electrode signal in response to the excitation signal. The electrode signal comprises the noise signal. The controller comprises a signal generator and a processor. The signal generator is configured to output an excitation signal having an excitation frequency value between harmonic frequencies.

The processor is configured to receive a series electrode signal values based on the electrode signal and a sampling rate, and to process each one of the electrode signal values prior to receiving a subsequent electrode signal value. The sampling period is greater than a processing time for the controller to process one of the electrode signal values and has a varying phase difference with respect to the excitation signal. To process the electrode signal value the controller is further configured to recall one or more stored filter coefficients that define a transfer function of a digital filter that reduces the noise signal by an effective amount, multiply each electrode signal value by one or more of the filter coefficients to form a corresponding one or more terms, and add each term to one of a plurality of output signal accumulators to calculate a series of filter output values, thereby filtering the electrode signal to reduce the noise signal.

In yet another embodiment of the present invention, a method for reducing a noise signal coupled into a vehicle occupant detection system is provided. The noise signal is characterized as having a series of harmonic frequencies based on a fundamental frequency. The system comprises a controller and an electrode. The controller is configured to output an excitation signal having an excitation frequency. The electrode is arranged proximate to an expected location of an occupant for sensing an occupant presence proximate thereto, and is configured to output an electrode signal in response to the excitation signal. The electrode signal comprises the noise signal and having an electrode magnitude indicative of the occupant presence. The method includes the step of selecting the excitation frequency between harmonic frequencies, and selecting a sampling period for sampling the electrode signal and thereby receives a series of electrode signal values. The sampling period is greater than a processing time for the controller to process one of the electrode signal values, and has a varying phase difference with respect to the excitation signal. The method further includes the step of determining a plurality of filter coefficients based on the excitation frequency and the sampling rate to define a transfer function of a digital filter that reduces the noise signal by an effective amount; receiving an electrode signal value. The method then processes the electrode signal value prior to receiving a subsequent electrode signal value in accordance with a predetermined algorithm. The predetermined algorithm includes multiplying the electrode signal value by one or more of the filter coefficients to form a corresponding one or more terms, and adding each term to one of a plurality of output signal accumulators to calculate a series of filter output values. The number of filter output values is determined based on a desired accuracy for the excitation magnitude. The method repeats the receiving and processing steps until the filter output values each include a term based on each of the filter coefficients. The method further includes the step of determining the excitation signal magnitude based on filter output values, and determining the occupant presence based on the excitation signal magnitude.

Further features and advantages of the invention will appear more clearly on a reading of the following detail description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
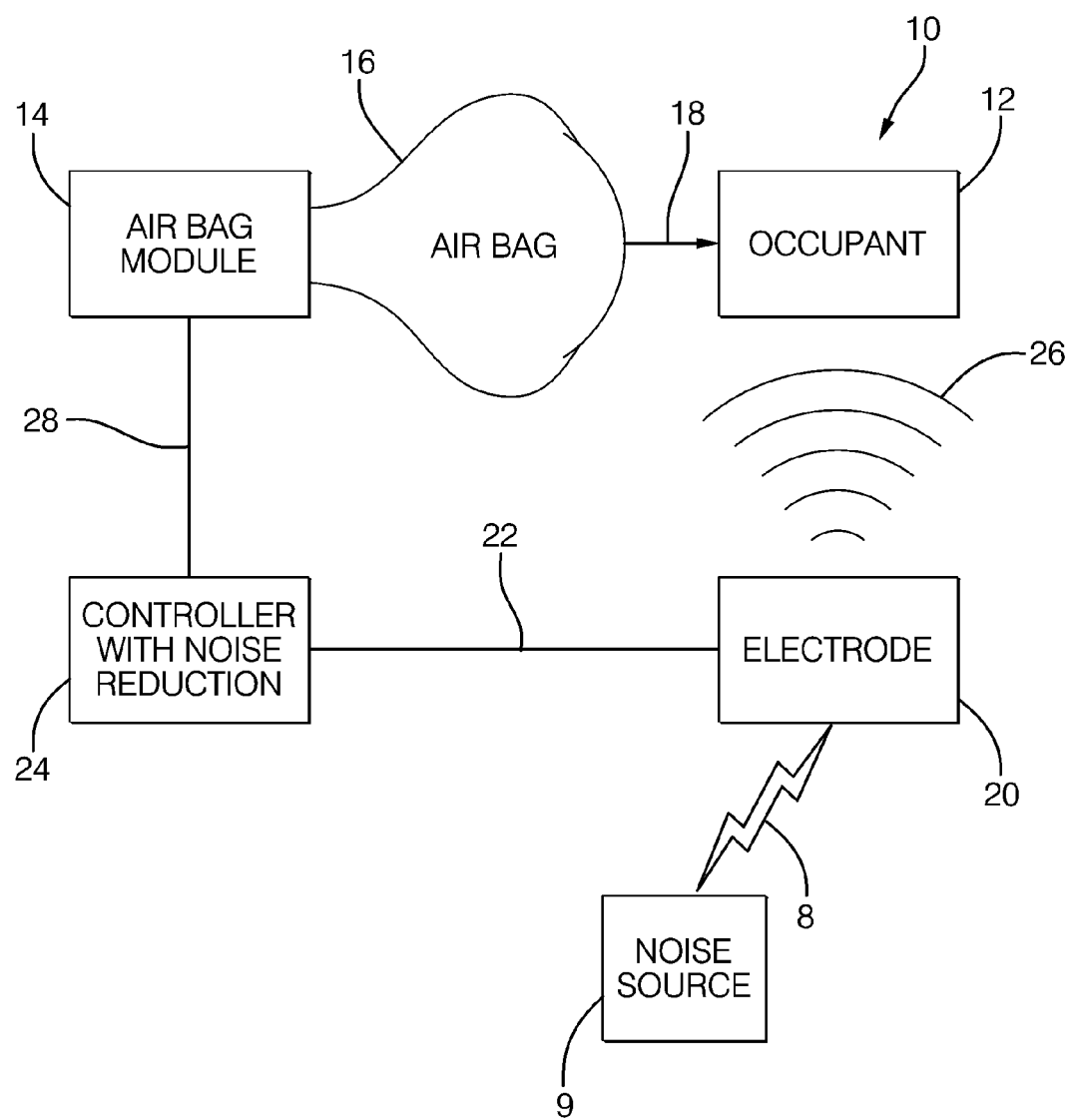
FIG. 1 block diagram of an occupant detection system, according to one embodiment.

In accordance with an embodiment of an occupant detector, FIG. 1 illustrates an occupant detection system 10 with noise reduction for reducing the effects a noise signal 8 coupled into the system 10 from a noise source 9. Having noise reduction is useful when determining the presence of an occupant 12 seated in a vehicle seat assembly 32, such as the embodiment illustrated in FIG. 2. The noise signal 8 may be characterized as comprising a series of harmonic frequencies based on a fundamental frequency. The noise source 9 may be any device that generates or radiates electromagnetic energy that could be coupled into the system 10. As a non-limiting example, the noise source 9 may be an inverter. In general, an inverter for use in an automobile inputs 12 Volt direct current (VDC) power from the vehicle electrical system and outputs 60 Hertz (Hz)/110 Volt alternating current (VAC) power. Having 110 VAC power in a vehicle may be useful for operating devices such as a laptop computer. A noise signal 8 generated by such an inverter may be characterized as comprising a 60 Hz fundamental frequency and a series of harmonic frequencies based on integer multiples of 60 Hz (e.g.—120 Hz, 240 Hz, 360 Hz, 480 Hz, . . . . ). The noise signal 8 is illustrated as impinging on, or being received by the electrode 20, but may alternately be coupled into the system 10 by way of a wire conducting electrode signal 22, or through a power supply connection (not shown) to the system 10.

The occupant 12 may be an adult or an infant in a child seat. The occupant detection system 10 may include an air bag module 14 that deploys an air bag 16 as indicated by an arrow 18 to restrain or protect the occupant 12 in the event of a vehicle collision. Determining an occupant presence in the vehicle seat assembly 32 may include characterizing the occupant (e.g., adult versus infant) which may be useful for enabling or disabling the air bag module 14 or other passenger protection device in the vehicle. It is advantageous to disable the air bag module 14 if the vehicle seat is empty or occupied by an infant in a child seat so the air bag 16 is not unnecessarily deployed. The air bag module 14 may receive an activation signal 28 from a controller 24 to arm the air bag module 14 so that a signal from a collision detection system (not shown) can deploy the air bag 16. It should be appreciated that the occupant detection system 10 may be used for other vehicle functions such as activating a seat belt warning if the seat belt is not properly deployed.

Figure 2:
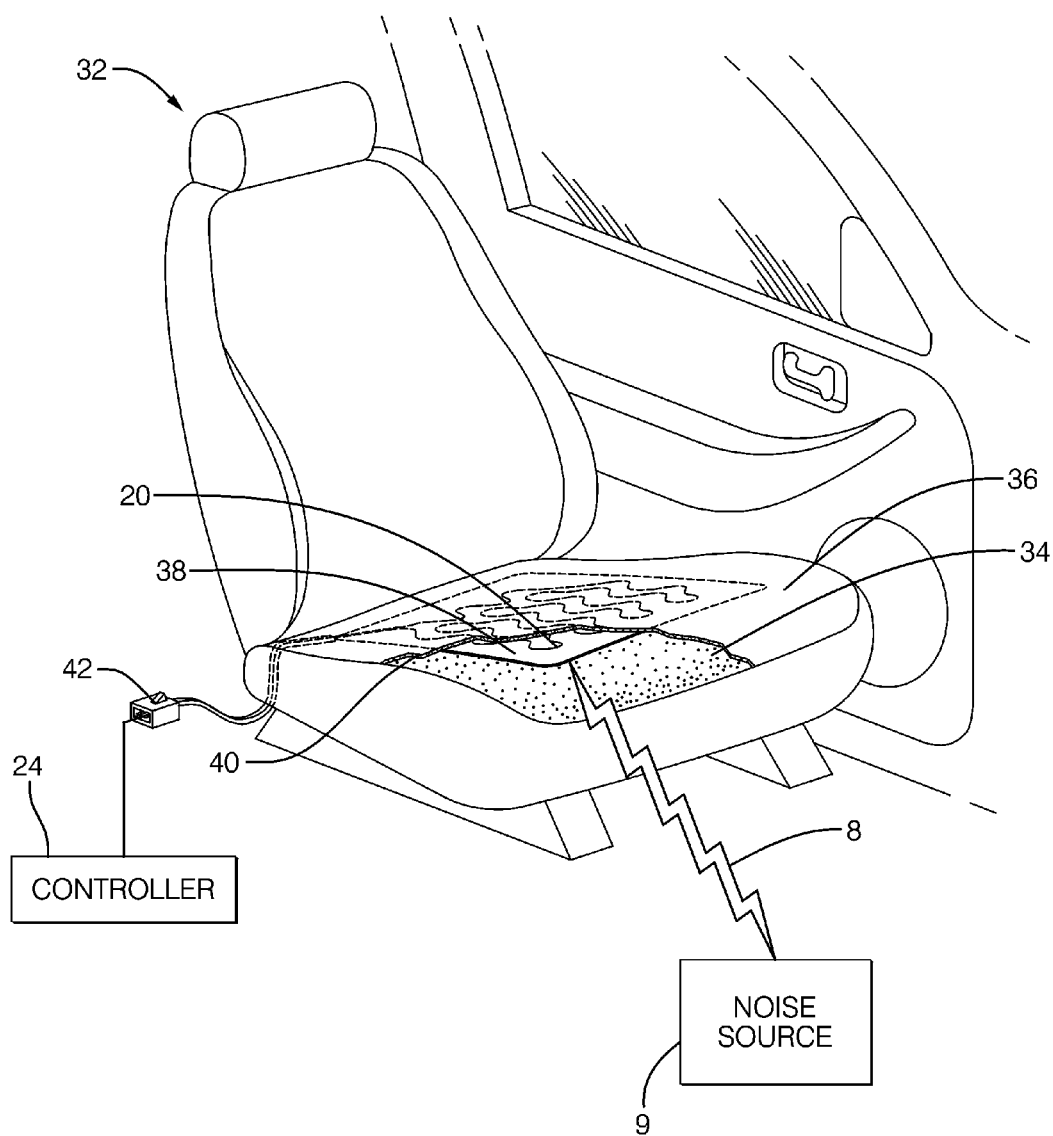
FIG. 2 is a perspective view of a seat assembly incorporating the occupant detection system shown in FIG. 1.

The occupant detection system 10 includes an electrode 20 arranged proximate to or adjacent to an expected location of the occupant 12 for sensing an occupant presence proximate thereto. FIG. 2 illustrates an exemplary, non-limiting embodiment of an electrode 20 arranged in the vehicle seat assembly 32 suitable for use by the occupant detection system 10. The seat assembly 32 is illustrated as being in a vehicle passenger compartment according to one embodiment, but could be used in any kind of vehicle, such as an airplane. In this embodiment, the seat assembly 32 has a seat cushion 34 for providing a seating surface 36 to support the occupant 12. Seat cushion 34 is suitably made of foam having characteristics suitable for seating use. Adjacent the seating surface 36 is an exemplary embodiment of the electrode 20 in the form of a wire coupled to a mat 38 that simplifies arranging the electrode 20 in seat assembly 32. The electrode 20 can be made of a variety of electrically conductive materials suitable for use adjacent the seating surface 36. Exemplary materials for forming the electrode 20 include metal wire, conductive fiber, conductive ink, metal foil, and metal ribbon. The cushion 34 is covered with covering 40 to protect the cushion 34 and the electrode 20, and to make the appearance of seat assembly 30 attractive. The electrode 20 may be arranged to be located adjacent or proximate to the seating surface 36. The electrode 20 may be coupled to the controller 24 by a connector 42 so electrode 20 can be readily connected to the controller 24.

FIG. 2 illustrates a non-limiting example of the noise source 9 being located on the floor of the vehicle adjacent to the seat assembly 32. Alternately the noise source 9 may reside on a console/arm rest arrangement next to the seat assembly 32, or may be located under the vehicle dash forward of the seat assembly 32.

Figure 3:
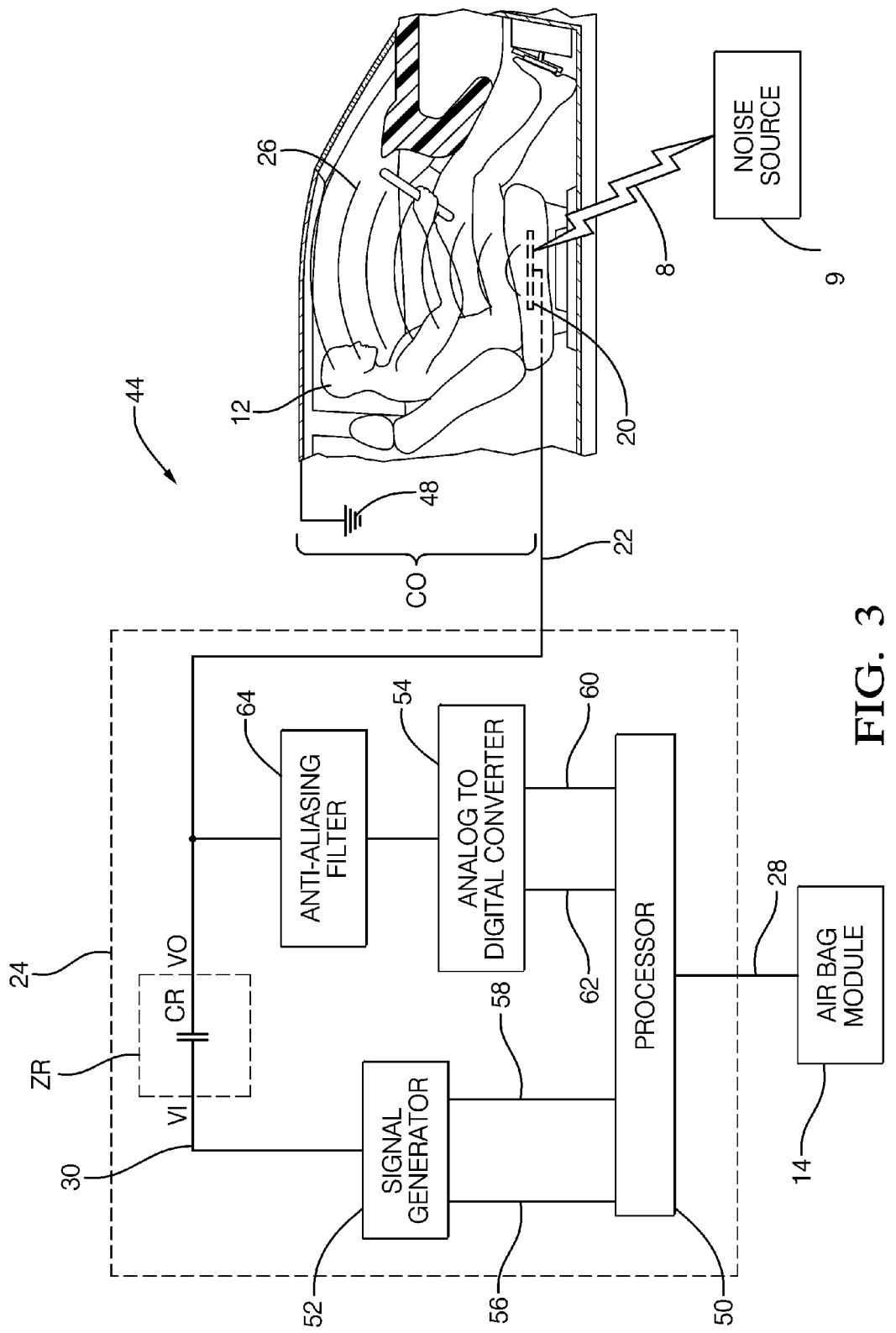
FIG. 3 is a block/circuit diagram illustrating an embodiment the occupant detection system shown in FIG. 1.

FIG. 3 illustrates an exemplary embodiment of a circuit diagram 44 useful for describing the operation of the occupant detection system 10. While not subscribing to any particular theory, it has been observed that the electrode 20 may exhibit an electrical characteristic similar to a capacitor, and that the value of the capacitor varies correspondingly with the presence or absence of an occupant 12 on or near the seat assembly 32. For example, U.S. patent application Ser. No. 12/700243 filed Feb. 4, 2010, which is hereby incorporated herein by reference, describes a vehicle occupant detector system that determines the presence of an occupant based on the capacitive characteristic exhibited by an electrode. It has been suggested that for the purpose of explanation the electrode 20 may be illustrated as one plate of a capacitor CO connected to the electrode signal 22. The other plate of capacitor CO may then correspond to the frame and body of the vehicle surrounding the occupant 12 and may be suitably shown as being connected to a reference ground 48. It follows that the dielectric material between the plates of capacitor CO corresponds at least in part to the occupant 12. The dielectric constant of the dielectric material influences the coupling of an electric field 26 between the plates and thereby influences the capacitance value of the capacitor CO.

It has been observed that when the seat is empty, the capacitance value of the capacitor CO is lower than the capacitance value when the seat is occupied. The presence of a large adult versus a small child, or the absence of an occupant may vary the dielectric constant of the dielectric material between the plates and thereby vary the capacitance value of capacitor CO. A typical capacitance value for the exemplary empty seat assembly 32 illustrated in FIG. 2 is about 100 pF. When an adult occupies the seat assembly 32, the capacitive term may increases as much as 900 pF.

FIG. 3 further illustrates an embodiment of a controller 24 that includes a reference impedance device ZR. In this embodiment, the reference impedance device ZR is electrically coupled to the electrode 20 to form a network generally having an electrical characteristic dependent on the reference impedance value and the capacitance value of capacitor CO. In one embodiment, the reference impedance device ZR is a reference capacitor CR. The reference capacitor CR has a first terminal connected to the electrode 20 that is designated to be a network output VO of the network, and a second terminal connected to a signal generator 52 that is designated to be a network input VI of the network. The signal generator 52 may be configured to output an excitation signal 30 to the network input VI to generate an electrode signal 22 on the network output VO in response to the excitation signal 30. The signal generator 52 in one embodiment receives a frequency control signal 56 and a magnitude control sign 58 from a processor 50 to generate the excitation signal 30 characterized as having an excitation magnitude at an excitation frequency.

In one embodiment, the excitation signal 30 may be in the form of a sinusoidal waveform. A sinusoidal waveform is advantageous because the value of the excitation magnitude and the electrode magnitude are readily correlated with the capacitance value of the capacitor CO and so may be indicative of the occupant presence. As such, the network characteristics may be determined by measuring an electrode magnitude corresponding to the magnitude of an electrode signal 22 generated in response to an excitation signal 30 output by the signal generator 52. If a noise signal 8 is present, it may also be included in the electrode signal 22 and may influence the electrode magnitude that is used to determine the occupant presence. The excitation frequency value may be selected to be between two consecutive harmonic frequencies of the noise signal 8 so the harmonic frequencies of the noise signal can be more easily filtered without affecting the electrode magnitude.

One embodiment of controller 24 may include a voltage detector such as an analog to digital converter (ADC) 54 connected to the network output VO to receive the electrode signal 22. The analog to digital converter 54 may be configured to capture samples of the electrode signal at a sample rate determined by a sampling signal 60 and output a series of electrode signal values a sampled signal connection 62. The processor 50 may be configured to receive the series electrode signal values based on the electrode signal and the sampling rate, and to process each one of the electrode signal values prior to receiving a subsequent electrode signal value. Typically, signal processing that includes digitally filtering sampled input data to generate filtered output data is done on a continuous basis, and so specialized digital signal processors are often required to perform operations at rates suggested above. However, for the occupant detection system 10, the speed at which output data is produced is not as critical, and so a system and method that spreads the data sampling and data processing over a period of time may provide a system and method that can employ a lower cost conventional microprocessor that does not have specialized hardware directed toward digital signal processing or the processing speed available from higher cost microprocessors. It will be appreciated that microprocessors either having or able to readily control a signal generator 52 and the ADC 54 are commercially available. In general, the system and method described herein combine sub-sampling the electrode signal 22 with a way to perform the calculations to implement a digital filter that allows for the use of the lower cost conventional microprocessor. As used here, sub-sampling means sampling the electrode signal 22 at a sample rate that is less than the sample rate typically considered necessary to accurately detect a peak value in a single cycle of the excitation signal.

Figure 4:
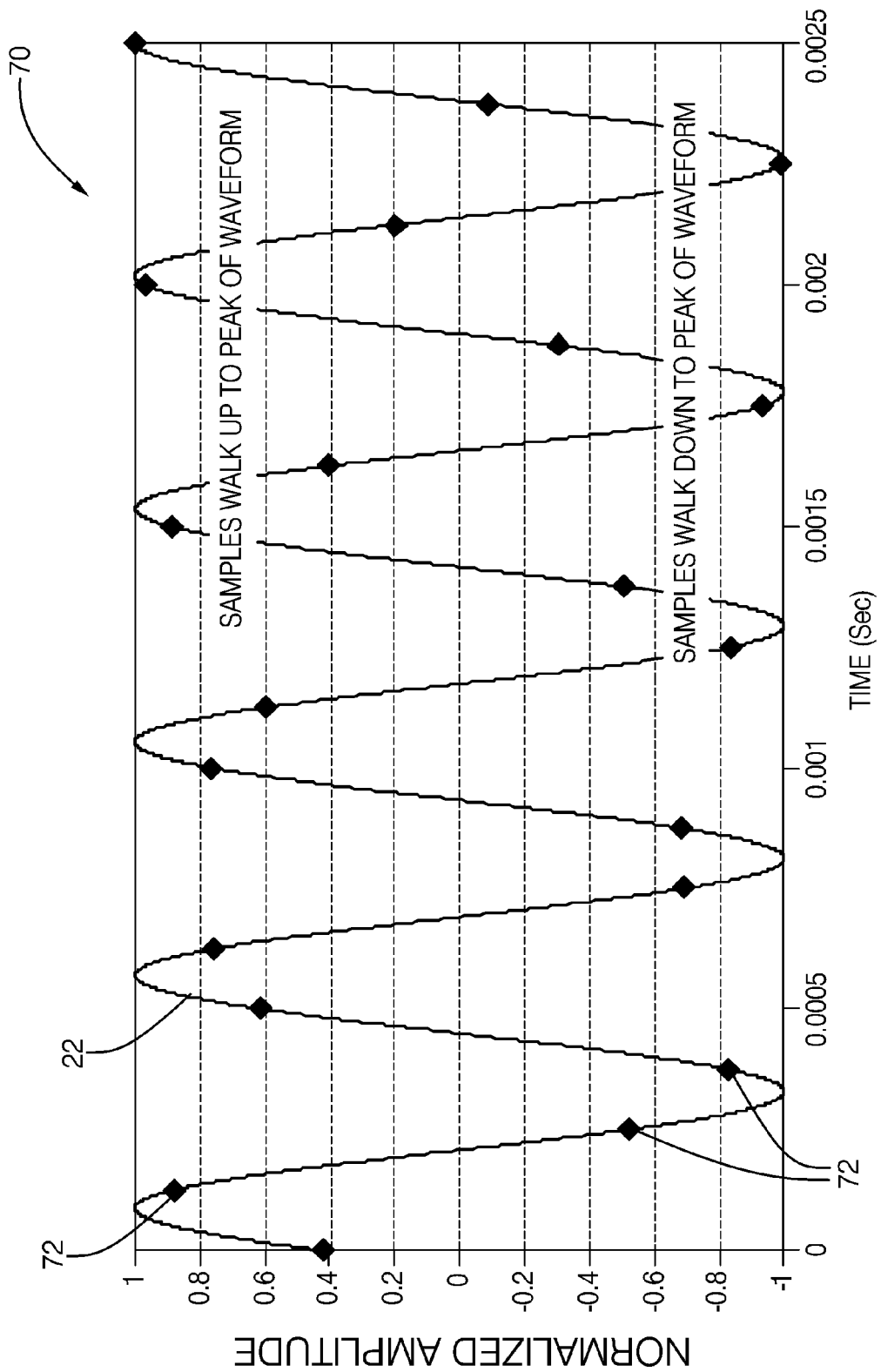
FIG. 4 is a graph of an exemplary signal occurring in FIGS. 1 and 3.

FIG. 4 shows a graph 70 of an exemplary electrode signal 22 arising from an excitation signal 30 having an excitation frequency of 2070 Hz. In this example, the sampling rate is 8000 Hz. Accordingly, a series of electrode signal values corresponding to markers 72 is output by the ADC 54 to the processor 50. The sampling rate is selected to be slow enough so that calculations associated with the digital filter, as described in more detail below, may be completed before a subsequent electrode signal value is received. As is clear from the graph, the sampling rate is sub-sampling the electrode signal 22 such that the peak values of 1.0 and −1.0 may not be accurately determined during one or two cycles of the electrode signal. The sampling rate is selected to have a varying phase difference with respect to the excitation signal so that the markers 72 shift with respect to the phase of the electrode signal 22 as time passes. The effect may be described as the samples phase shifting along the electrode signal 22 or as walking up or down the waveform to the peak of the waveform, as illustrated. As can be seen in FIG. 4, if the data samples from the first or second cycle of the electrode signal, that is prior to time 0.001 seconds, were the only data samples available to determine a peak value of the electrode signal 22, a substantial error may occur. However, if the sampling continues, the varying phase difference causes the markers to eventually align with the peak value, for example after time 0.002 seconds. The varying phase difference between the excitation signal 30 and the sampling rate is such that an electrode signal value of the electrode signal 22 is eventually sampled that accurately represents the peak value of the electrode signal 22. It is understood that it is acceptable for the occupant detection system 10 to take up to 0.2 seconds to accurately determine an occupant presence, and so data sampling and processing can be spread out over several cycles of the excitation signal 30.

The occupant detection system 10 may employ a digital filter to remove or reduce the noise signal 8 from the electrode signal 22, and thereby minimize the effect the noise signal 8 has on determining an occupant presence. A predetermined algorithm providing a digital filter may be programmed into the processor 50. Typically, a digital filter has an array of predetermined filter coefficients where the number of coefficients corresponds to the order of the filter. The method of determining the filter coefficients is known to those skilled in the art of digital filter design. Each filter output may be calculated by multiplying each coefficient by one of each previously received filter input values. In the example below, the filter input values are numbered according to the sequence that the filter input values were received. For example X11 was received one sample rate period after X10 was received, which was received one sample rate period after X9 was received, and so on. A list of equations that determines a sequence of filter output values for an exemplary digital filter is shown below. Following this example and applying such a filter to an occupant detection system 10, each filter output value, that is Y0, Y1, Y2, Y3, and Y4, is calculated and then processed to determine the electrode magnitude. For example, the minimum value or most negative value and the maximum value or most positive value are selected from the sequence of filter output values to determine the electrode magnitude and thereby determine the occupant presence.

$Y0 = H0X9 + H1X8 + H2X7 + H3X6 + H4X5 + H5X4 + H6X3 + H7X2 + H8X1 + \underline{H9X0}$ $Y1 = H0X10 + H1X9 + H2X8 + H3X7 + H4X6 + H5X5 + H6X4 + H7X3 + \underline{H8X2} + H9X1$ $Y2 = H0X11 + H1X10 + H2X9 + H3X8 + H4X7 + H5X6 + H6X5 + \underline{H7X4} + H8X3 + H9X2$ $Y3 = H0X12 + H1X11 + H2X10 + H3X9 + H4X8 + H5X7 + \underline{H6X6} + H7X5 + H8X4 + H9X3$ $Y4 = H0X13 + H1X12 + H2X11 + H3X10 + H4X9 + H5X8 + \underline{H6X7} + H7X6 + H8X5 + H9X4$ The transfer function associated with a digital filter corresponds to the array of predetermined filter coefficients. For the exemplary digital filter corresponding to the equations above, the filter coefficients are H0, H1, H2 . . . H9. The processor 50 may include memory configured to store the filter coefficients. When calculations are performed, the processor may be further configured to execute a predetermined algorithm. The predetermined algorithm may recall one or more stored filter coefficients that define a transfer function of the digital filter in preparation to making calculations. Typically, a digital signal processor will perform all of the multiplications and additions necessary to calculate a filter output value after the last input value is received. This is done since the filter outputs are typically needed as soon as possible in continuous signal processing applications. For the example above, this would require ten multiplies and ten additions amounting to twenty operations as each input value is received. However, in the occupant detection system 10, there is no need to immediately output a filter output value since the sequence of filter output values are searched or processed to determine an electrode magnitude. The sample rate may be selected to be slow enough so that as each electrode signal value is received, there is time for a lower cost conventional microprocessor to perform calculations associated with the specific electrode signal value. Also, the processor is configured or programmed to perform all of the multiplications associated with an input value as each input value is received. For the example above, when X7 is received, the five underlined multiplications are performed to form five corresponding terms, and each term is added to one of a five accumulators corresponding to the five filter output values, thereby reducing the number of operations as each input value is received to ten operations.

The exemplary equations given above are understood to be a simplified example for discussion purposes. As suggested in the background, an appropriate filter for the occupant detection system 10 having noise reduction may have a digital filter with 1040 coefficients. As suggested by FIG. 4, more than five filter output values would typically be needed to reliably determine a peak value of the electrode signal 22. By way of an example, a suitable number of filter output values is forty (40). As such, as each electrode signal value is received, forty multiplications and forty additions, or eighty (80) operations need to be performed before a subsequent electrode signal value is received. This stands in contrast to the 1040 multiplication and 1040 additions amounting to 2080 operations performed by a typical digital signal processor as each input value is received for continuous processing.

The electrode signal 22 further may also be characterized as having an electrode magnitude corresponding to the magnitude of the electrode signal 22 without the noise signal 8. In one embodiment, the electrode magnitude may correspond to a difference between a maximum peak value and a minimum peak value, also known as a peak-to-peak magnitude. Such a value is readily determined by searching the accumulators corresponding to the filter output values for a maximum and minimum value. The electrode magnitude is generally indicative of the occupant presence. The controller may be further configured determine the occupant presence based on the electrode magnitude. Such a determination may be by way of a look-up table or one or more equations.

In another embodiment, the system 10 may include an anti-aliasing filter 64 configured to reduce a fold-over signal having a fold-over frequency based on the sample rate and the excitation frequency. Generally, digitally sampled systems have a foldover frequency corresponding to half of the electrode signal sampling. By way of an example corresponding to the example given above, a system using a sampling rate of 8 kHz has a foldover frequency of 4 KHz. If the excitation signal is 2.07 kHz as described above, the first foldover signal occurs at 5.93 KHz. In order to prevent higher frequency noise from aliasing down into the pass band of the digital filter, it is necessary to reduce such foldover signals input into the digital filter. In one non-limiting example, the anti-aliasing filter 64 may be arranged to filter signals received by the ADC 54. Preferably, the anti-aliasing filter 64 has a sufficiently sharp roll-off to ensure that the higher frequency foldover signals are attenuated by at least 40 dB. For the example above, a sufficient filter may be a 5th order elliptical filter with a cutoff frequency of 2.25 KHz.

Figure 5:
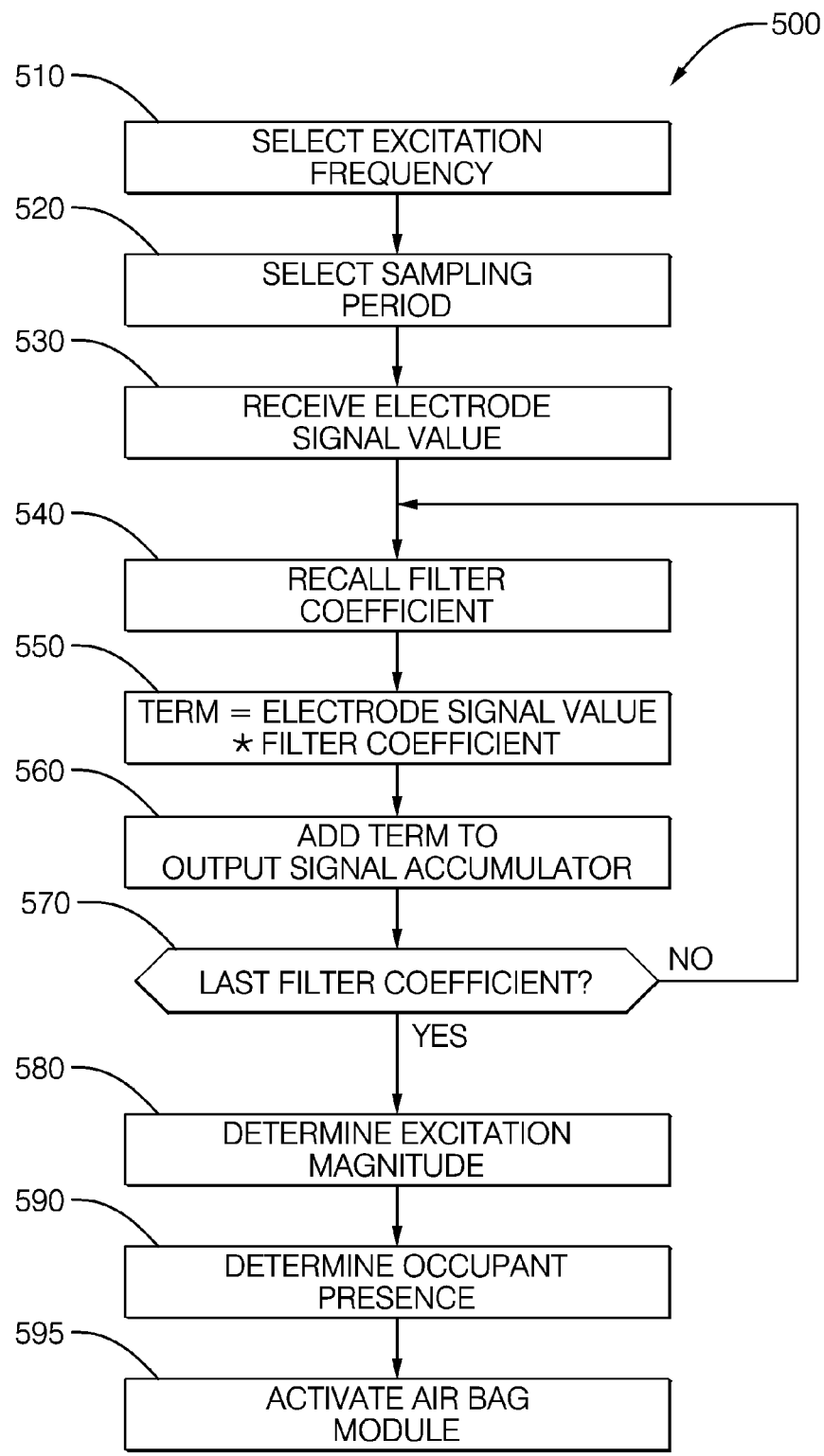
FIG. 5 is a flow chart illustrating a method to determine presence of an occupant residing in the seat assembly shown in FIG. 2.

FIG. 5 illustrates an embodiment of a method or routine 500 for detecting a vehicle occupant 12 in a vehicle seat assembly 32. The method is generally directed at reducing a noise signal 8 originating from a noise source 9 that may be coupled into a vehicle occupant detection system 10. The noise signal 8 may be characterized as having a series of harmonic frequencies based on a fundamental frequency. The system 10 may include a controller 24 and an electrode 20 coupled to the controller 24. The controller 24 may be configured to output an excitation signal 30 having an excitation frequency. The electrode 20 is generally arranged to be proximate to an expected location of the occupant 12 for sensing the occupant presence proximate thereto. The electrode 20 is also configured to output an electrode signal 22 in response to the excitation signal 30. The electrode signal may include the noise signal 8 and may have an electrode magnitude indicative of the occupant presence.

At step 510 of method 500, the controller 24 selects an excitation frequency of the excitation signal 30 to be between harmonic frequencies of the noise signal 8. The selection may be base on a predetermined or expected noise fundamental frequency such as 60 Hz, or the excitation frequency may be selected by monitoring the electrode signal, such as when the excitation signal 30 is not being output, so that the frequency spectrum of the noise signal 8 may be analyzed. At step 520, the controller 24 selects a sampling period for sampling the electrode signal 22. The sampling period is selected to be greater than a processing time for the controller 24 to process one of the electrode signal values. The sampling period determines the rate that the controller 24 receives a series of electrode signal values. The sampling period is also selected to have a varying phase difference with respect to the excitation signal. By having a varying phase difference relative to the excitation frequency, sampling the electrode signal over multiple cycles of the excitation signal will increase the probability that the peak values of the electrode signal will be sampled even though the relationship between the reference impedance and the capacitance value of capacitor CO may change as the occupant presence changes.

The transfer function characteristics of a digital filter are determined by a plurality of filter coefficients, as suggested by the equations above. The plurality of filter coefficients is also determined based on the excitation frequency and the sampling rate. The combination of excitation frequency, sampling rate and filter coefficients cooperate to influence the transfer function of the digital filter, and are selected so that the noise signal is reduced by an effective amount, such as 40 dB for example. At step 540, as part of the digital filtering, filter coefficients may be recalled from a memory, for example, from a memory within controller 24 as needed. After the electrode signal value is received, the value is processed through the digital filter. The processing includes step 550, multiplying the electrode signal value by one or more of the filter coefficients to form a corresponding one or more terms, and step 560, adding each term to one of a plurality of output signal accumulators to calculate a series of filter output values. The number of filter output values is determined based on a desired accuracy for the excitation magnitude. The steps 540, 550, 560, and 570 are repeated until the filter output values for accumulator includes a term based on each of the filter coefficients.

At step 580, after the last filter coefficient is included in each accumulator, the excitation signal magnitude may be determined based on filter output values. This step may search all of the accumulator output values for a maximum and minimum value, thereby determining a peak-to-peak magnitude, or may calculate a root-mean-squared value as an indicator of the electrode magnitude. At step 590, the excitation magnitude may be used to determine the occupant presence. In general, the presence of an occupant increases the capacitance value of CO, and so the presence of an occupant will decrease the electrode magnitude relative to the electrode magnitude determined when the seat assembly 32 is empty. The method 500 may also include step 595 where and air bag module is activated based on determining an occupant presence.

Accordingly, an occupant detection system 10, a controller 24 for the occupant detection system 10, and a method of detecting an occupant 12 when an electrode signal 22 may include a noise signal 8 from a noise source 9 is provided. The means for suppressing or removing the noise signal 8 from the electrode signal 22 improves the accuracy of determining the presence of an occupant 12 when the noise signal 8 may be corrupting the electrode signal 22. The means described herein is an improvement over other known means in that the data processing of the electrode signal, is such that a lower cost conventional microprocessor may be used to perform the digital filtering, as opposed to a higher cost digital signal processor or a high-speed microprocessor. In particular, the electrode signal 22 is sampled at a relatively slow rate considering the desired accuracy, but the sampling persists over several periods of the excitation signal and has a varying phase difference with the excitation signal so that the desired accuracy may be obtained. Furthermore, the data processing is done in such a way that the digital filtering calculations are spread out over the extended sampling time so that a lower cost conventional microprocessor may perform the necessary calculations for a digital filter.

While this invention has been described in terms of the preferred embodiments thereof, it is not intended to be so limited, but rather only to the extent set forth in the claims that follow.

We claim:

1. A vehicle occupant detection system with noise reduction for reducing a noise signal coupled into the system, said noise signal characterized as having a series of harmonic frequencies based on a fundamental frequency, said system comprising:
a controller configured to output an excitation signal having an excitation frequency value between harmonic frequencies; and
an electrode arranged proximate to an expected location of an occupant for sensing an occupant presence proximate thereto, said electrode coupled to the controller and configured to output an electrode signal in response to the excitation signal, said electrode signal comprising the noise signal,
said controller further configured to receive a series of electrode signal values based on the electrode signal and at a rate based on a sampling period, and to process each one of the electrode signal values prior to receiving a subsequent electrode signal value, wherein said sampling period is greater than a processing time for the controller to process one of the electrode signal values and has a varying phase difference with respect to the excitation signal, wherein to process each electrode signal value said controller is configured to execute a pre-determined algorithm; wherein to execute said pre-determined algorithm said controller is further configured to recall one or more stored filter coefficients that define a digital filter that reduces the noise signal by an effective amount, multiply each electrode signal value by one or more of the filter coefficients to form a corresponding one or more terms, and add each term to one of a plurality of output signal accumulators to calculate a series of filter output values, thereby filtering the electrode signal to reduce the noise signal.

2. The system in accordance with claim 1, wherein said electrode signal further comprises an electrode magnitude indicative of the occupant presence, and said controller is further configured determine the electrode magnitude based on values in the output signal accumulators and determine the occupant presence based on the electrode magnitude.

3. The system in accordance with claim 1, wherein the sampling rate is selected to have a varying phase difference with respect to the excitation signal.

4. The system in accordance with claim 1, further comprising an anti-aliasing filter configured to reduce a fold-over signal having a fold-over frequency based on the sample rate and the excitation frequency.

5. The system in accordance with claim 1, wherein the electrode is adjacent a seating surface of a vehicle seat to sense the occupant seated in the vehicle seat.

6. The system in accordance with claim 1, further comprising an air bag module receiving an activation signal from the controller, wherein said activation signal is based on the determined occupant presence.

7. A controller having noise reduction for use in a vehicle occupant detection system having a noise signal coupled into the system, said noise signal characterized as having a series of harmonic frequencies based on a fundamental frequency, said system comprising: an electrode arranged proximate to an expected location of an occupant for sensing an occupant presence proximate thereto, said electrode coupled to the controller and configured to output an electrode signal in response to an excitation signal, said electrode signal comprising the noise signal, said controller comprising:

a signal generator configured to output an excitation signal having the excitation frequency value between harmonic frequencies; and a processor configured to receive a series electrode signal values based on the electrode signal and a sampling rate, and to process each one of the electrode signal values prior to receiving a subsequent electrode signal value, wherein said sampling period is greater than a processing time for the controller to process one of the electrode signal values and has a varying phase difference with respect to the excitation signal, wherein to process the electrode signal value said controller is configured to execute a pre-determined algorithm; wherein to execute said pre-determined algorithm said controller is further configured to recall one or more stored filter coefficients that define a digital filter that reduces the noise signal by an effective amount, multiply each electrode signal value by one or more of the filter coefficients to form a corresponding one or more terms, and add each term to one of a plurality of output signal accumulators to calculate a series of filter output values, thereby filtering the electrode signal to reduce the noise signal.

8. The controller in accordance with claim 7, wherein said electrode signal further comprises an electrode magnitude indicative of the occupant presence, and said processor is further configured determine the electrode magnitude based on values in the output signal accumulators and determine the occupant presence based on the electrode magnitude.

9. A method for reducing a noise signal coupled into a vehicle occupant detection system, said noise signal characterized as having a series of harmonic frequencies based on a fundamental frequency, said system comprising a controller and an electrode, said controller configured to output an excitation signal having an excitation frequency, said electrode arranged proximate to an expected location of an occupant for sensing an occupant presence proximate thereto and configured to output an electrode signal in response to the excitation signal, said electrode signal comprising the noise signal and having an electrode magnitude indicative of the occupant presence, said method comprising:

selecting the excitation frequency between harmonic frequencies;

selecting a sampling period for sampling the electrode signal and thereby receive a series of electrode signal values, said sampling period is greater than a processing time for the controller to process one of the electrode signal values and has a varying phase difference with respect to the excitation signal;

determining a plurality of filter coefficients based on the excitation frequency and a sampling rate to define a transfer function of a digital filter that reduces the noise signal by an effective amount;

receiving an electrode signal value; then processing, by a processor, the electrode signal value prior to receiving a subsequent electrode signal value in accordance with a predetermined algorithm repeating the receiving and processing steps until the filter output values each include a term based on each of the filter coefficients;

determining the excitation signal magnitude based on filter output values; and determining the occupant presence based on the excitation signal magnitude; wherein processing includes multiplying the electrode signal value by one or more of the filter coefficients to form a corresponding one or more terms, and adding each term to one of a plurality of output signal accumulators to calculate a series of filter output values, wherein the number of filter output values is determined based on a desired accuracy for the excitation magnitude.

10. The method in accordance with claim 9, further comprising the step of providing an anti-aliasing filter configured to filter reduce a fold-over signal having a fold-over frequency based on the sample rate and the excitation frequency.

11. The method in accordance with claim 9, further comprising the step of activating an air bag module based on determining an occupant presence.

* * * * *